United States Patent [19]

McCarty

[11] 4,447,947
[45] May 15, 1984

[54] PROCESS FOR MAKING FLUID-COOLED ELECTRICAL CONDUCTOR

[75] Inventor: Fred B. McCarty, San Pedro, Calif.

[73] Assignee: The United States of America as represented by the Secretary of the Air Force, Washington, D.C.

[21] Appl. No.: 465,214

[22] Filed: Feb. 9, 1983

Related U.S. Application Data

[62] Division of Ser. No. 206,413, Nov. 13, 1980, abandoned.

[51] Int. Cl.³ .............................................. H01R 43/00
[52] U.S. Cl. .................................. 29/825; 174/15 C; 310/54; 310/64
[58] Field of Search ....................... 29/825, 424, 527.2, 29/596; 310/64, 61, 54; 336/57; 174/15 C

[56] References Cited

U.S. PATENT DOCUMENTS

| 2,499,977 | 3/1950 | Scott | 29/424 X |
| 3,503,200 | 3/1970 | Roberts et al. | 29/424 X |
| 3,636,620 | 1/1972 | Long | 29/825 |
| 4,260,924 | 4/1981 | Lugosi et al. | 310/64 X |

FOREIGN PATENT DOCUMENTS 54-8802  1/1979  Japan ................................ 310/64

Primary Examiner—Howard N. Goldberg
Assistant Examiner—Carl J. Arbes
Attorney, Agent, or Firm—Donald J. Singer; Jacob N. Erlich

[57] ABSTRACT

A fluid-cooled electrical conductor having excellent heat transfer, low eddy loss, and good space factor is made by encapsulating small magnet wire strands, which constitute an electrically conductive member, in a meltable matrix that supports the wire; wrapping the matrix with an insulating tape having a silicone adhesive backing and thereby forming an insulating member that surrounds the matrix; perforating the insulating member so that an inlet and an outlet are formed through which an insulating coolant fluid can flow; and, heating, melting, and removing the meltable matrix.

15 Claims, 7 Drawing Figures

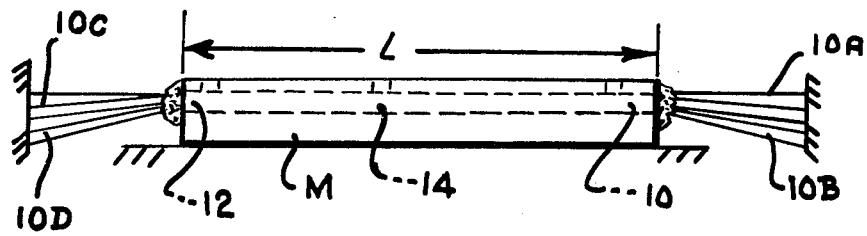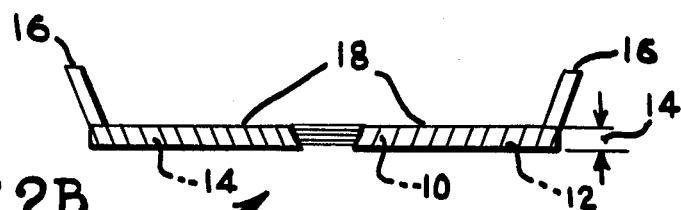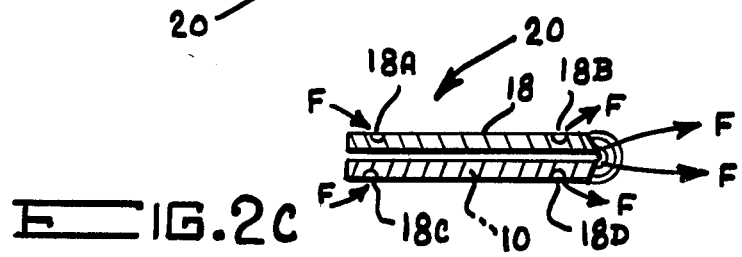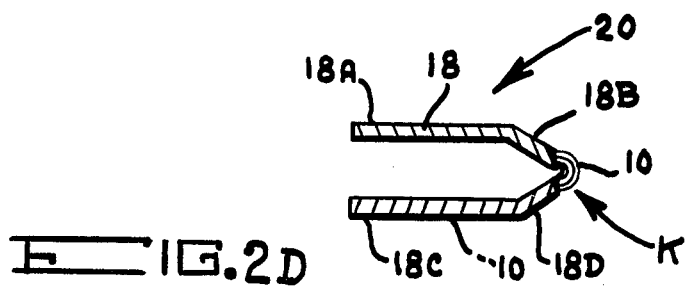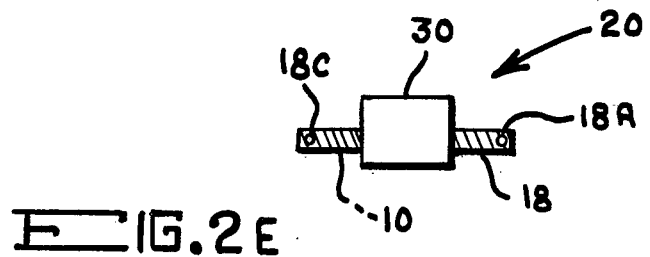

PROCESS FOR MAKING FLUID-COOLED ELECTRICAL CONDUCTOR

STATEMENT OF GOVERNMENT INTEREST

The invention described herein may be manufactured and used by or for the Government for governmental purposes without the payment of any royalty thereon.

This is a division of application Ser. No. 206,413, filed Nov. 13, 1980, now abandoned.

BACKGROUND OF THE INVENTION

This invention relates to an electrical conductor and, more particularly, to a fluid-cooled electrical conductor and to a method of making same.

In the design of a light-weight, high-frequency electric machine, it became apparent that conventional approaches to direct fluid cooling of electrical conductors were not feasible. Hollow, fluid-cooled, electrical conductors could not be obtained in the small size required, would have had excessive eddy loss, could not have operated at the desired high current density at acceptable temperature rise and coolant pressure drop because of inferior heat transfer capability, and were not available with an insulating varnish coat.

I have solved the above-mentioned problems by inventing a unique fluid-cooled electrical conductor, and a novel method of making the inventive conductor. By so doing, I have significantly advanced the state-of-the-art.

SUMMARY OF THE INVENTION

The invention is a fluid-cooled electrical conductor, and a method of making same. The conductor comprises an electrically conductive member that is made of a plurality of standard magnet wires which are clustered together, and an insulating member that is made of adhesive tape of insulating material, that surrounds the electrically conductive material, and that has an inlet and an outlet. The conductor is cooled by flowing a coolant fluid through the inlet, the insulating member, and the outlet, thereby causing the coolant fluid to flow along, between, and around the strands of the electrically conductive member. The method of making the conductor includes the steps of encapsulating the strands of wire in a flexible and easily removable matrix material (such as a casting wax, a resin, or the like); applying (i.e., forming) the insulating member by wrapping the encapsulated wire with a tape having a silicone adhesive backing; shaping the tape-wrapped matrix into a predetermined shape for a preselected use; perforating the insulating member to form an inlet and an outlet; and finally removing the matrix material, after its purpose of providing dimensional stability during handling, shaping, and installation of the conductor has been fulfilled.

The inventive conductor can be made in very small sizes, and has excellent heat transfer capability and low eddy losses. The instant invention is useable in virtually any application where direct fluid cooling of electrical conductors is required (e.g., in motors, generators, inductors, transformers, cables, magnets, solenoids, and the like), and as previously stated specifically solves the problems set forth hereinabove.

Accordingly, an object of this invention is to provide a fluid-cooled electrical conductor having excellent heat transfer capability, i.e., the effectiveness of heat transfer from the conductor to the coolant fluid is greatly improved. Improvement is realized because for a given section of conductor, the surface area exposed to the coolant increases and/or the numbers of strands increases.

Another object of this invention is to provide a fluid-cooled electrical conductor having low eddy loss.

Still another object of this invention is to provide a fluid-cooled electrical conductor having good space factor.

Yet another object of this invention is to provide a fluid-cooled electrical conductor that can be operated at a high current density with acceptable temperature rise and coolant pressure drop.

A further object of this invention is to permit fabrication of the electrical conductor from low cost, readily available wire (i.e., standard magnet wire), thereby obviating the high cost of specially extruding the metal conductor, and also avoiding the present need to procure a mill run of hundreds of pounds of the metal conductor.

A still further object of this invention is to provide a fluid-cooled electrical conductor that is easily formed and installed.

A yet further object of this invention is to render unnecessary the conventional varnishing of the electrical conductor, and thereby eliminate the inherent deterioration of the varnish because of aging, cracking, and crazing.

These objects, as well as related objects, of this invention will become readily apparent after a consideration of the description of the invention, together with reference to the contents of the Figures of the drawing.

DESCRIPTION OF THE DRAWING

FIGS. 2A–2E, inclusive, are various and diverse views showing, in their totality, some of the steps of my inventive method that are performed in making my electrical conductor.

DESCRIPTION OF THE INVENTIVE METHOD

Figure 1:
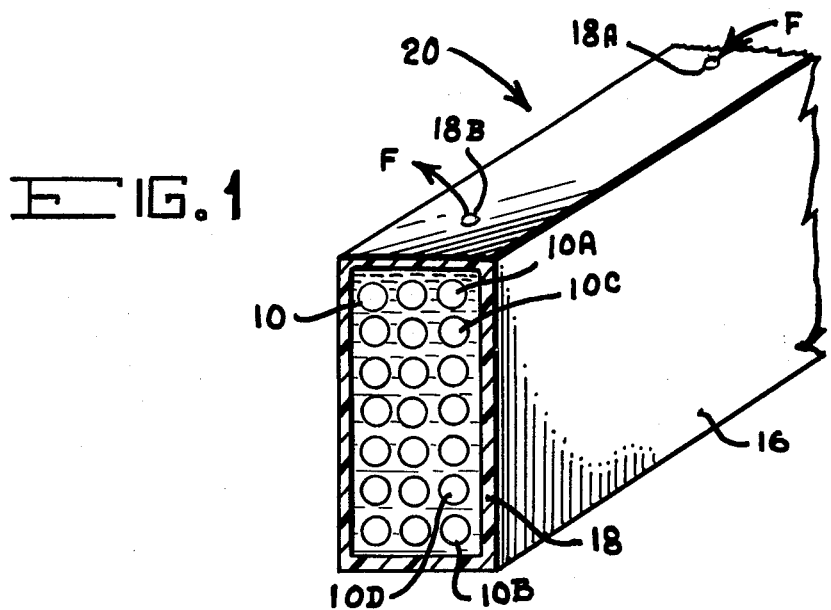
FIG. 1 is a perspective view, in simplified schematic and pictorial form, partially fragmented and partially in cross section, of a preferred embodiment of the inventive electrical conductor.

As a preliminary matter, it is to be noted that FIGS. 1 and 3 (the contents of which will be discussed in detail later herein) show the result of practicing the steps of my preferred method of making my inventive fluid-cooled electrical conductor, whereas FIGS. 2A–2E, inclusive show some of the steps of the method.

Now, with reference to all of the Figures of the drawing, my preferred method of making my electrical conductor comprises, essentially, the below-listed steps.

Firstly, encapsulating a stranded (i.e., having a plurality of strands of electrically conductive wires) electrically conductive member 10, FIGS. 1 and 2A, of predetermined length L in a material, 12, FIGS. 2A and 2B, having characteristics of good adhesion, flexibility, and removability, such as an appropriate wax (e.g., casting wax) or a resin (e.g., a thermoplastic elastomer resin which is readily soluble in methyl ethyl ketone). This results in the formation of a matrix 14, FIGS. 2A and 2B, in which the stranded electrically conductive member 10 is contained and supported.

It is here to be noted that the strands of wire (such as representative ones 10A–10D, inclusive, FIGS. 1 and 2A) may be accurately positioned within a mold M by applying tension by any conventional means prior to encapulation, and that these strands also may be twisted before encapsulation. It is also to be noted that preferably these strands are made of standard, readily-available, and inexpensive magnet wire. It is further to be noted that the cross section of the encapsulation (and, of course, the configuration of the array of the strands) may be of any desired or needed shape, such as circular or, as shown in FIG. 1, rectangular.

Next, wrapping the matrix 14, FIG. 2B, with an adhesive tape 16, FIG. 2B, made of an insulating material. I prefer to use "Kapton" brand tape (commercially available from the E. I. DuPont Co., Wilmington, Del.), which is a tape made of polyimide film, with a silicone adhesive backing. As is well known, silicone is an electrical insulator. This step results in creating a member 18, FIGS. 1–3, inclusive, of insulating material which surrounds the matrix 14 and, of course, the electrically conductive member 10 contained in and supported by the matrix material 12. As a related matter, if 2.5 mil thick "Kapton" tape with a silicone adhesive backing is used, I prefer to half-lap the tape 16 while wrapping the matrix 14, and then re-wrap the matrix 14 while again half-lapping the tape 16, thus creating an insulating member 18 of a double layer of half-lapped tape which is 10 mil thick.

In some applications, it may be convenient to procure commerically available tubing of a desired insulating material and dimensions, and simply slide this tubing over the matrix 14, as opposed to the procedure of wrapping the matrix.

Then, perforating the insulating member 18 to form, respectively, at least one inlet, such as 18A, FIG. 2C, and at least one outlet, such as 18B, FIG. 2C, for passage therethrough of an insulating coolant fluid, such as F, FIG. 2C. I prefer to perforate the insulating member 18 at this stage of making my electrical conductor, because the insulating material 16 is easier to perforate if the matrix material 12 has not been removed.

Lastly, removing the matrix material 12 from the electrically conductive member 10 and from the perforated insulating member 18, so that the space occupied by the matrix 14 will be comprised of coolant fluid F, rather than matrix material 12 in normal usage.

As a result of the performance of these fundamental steps, a unique fluid-cooled (i.e., fluid-coolable) electrical conductor 20, FIGS. 1, 2C and 2D, is thereby made. It is here to be noted that the conductor 20, which includes the electrically conductive member 10 and the perforated insulating member 18 that surrounds the electrically conductive member 10, can be connected in an electrical machine or device 30, as is shown schematically in FIG. 2E, and as will be described later herein.

When the predetermined shape of the electrical conductor 20 for a preselected use is known, my method may be varied by performing the additional step of shaping the insulated, wrapped matrix 14 into the predetermined shape for the preselected use before performing the step of perforating the insulating member 18 and/or before performing the step of removing the matrix material 12. This additional step is shown in sequence in FIGS. 2C and 2D. Therein the predetermined shape is that of a conventional diamond-hairpin conductor, and the preselected use is for insertion in a stack. As can be readily surmised, shaping is accomplished more easily while the matrix material still has not been removed, and the choice of location and/or the choice of the number of perforations can be made more easily if the shape and intended use are known. For example, and with reference to FIGS. 2C, 2D, and 2E, because of the known predetermined shape and preselected use, the fluid cooled electrical conductor 20 is bent in half and together, as is shown in 2C, and two inlets 18A and 18C and two outlets 18B and 18D are formed by perforating the insulating material 18. Next, the electrical conductor is spread and bent such that a "knuckle" (generally designated K) is formed. If the insulating material at the apex of the "knuckle" K is spread away or removed, such that the strands of wire of the electrically conductive member are exposed and fluid F can exit, then outlets 18B and 18D would not be provided.

After a conductor is installed in an electrical device such as represented by 30, FIG. 2E, the matrix material is removed. The free ends are connected in an electrical circuit as appropriate for the device. In FIG. 2E, the conductor 20 is straight, not bent.

In the event that, in addition to the other characteristics, the matrix material 12 also is heat-meltable (e.g., a casting wax, or the hereinbefore described resin), then my method can comprise the additional step of heat-melting the matrix material before removing it. For example, if the matrix material is a casting wax, the wax is heated, melted, and removed with the use of a hot oil. Alternatively, the wax can be removed, after having been heat-melted, by the use of centrifuging. If, on the other hand, the matrix material is the aforedescribed resin, then it is heat-melted by any suitable means and the residue is removed with the use of methyl ethyl ketone or a suitable hot purging fluid.

DESCRIPTION OF THE PREFERRED EMBODIMENT

With reference to FIG. 1, therein is shown in a perspective view, partially fragmented and partially in cross section, a preferred embodiment of my inventive fluid-cooled electrical conductor 20.

In the most basic and generic structural form, my inventive conductor 20 comprises: an electrically conductive member 10 which, in turn, comprises a plurality of strands of electrically conductive material, such as representative strands 10A, 10B, 10C, and 10D; means for insulating the electrically conductive member 10, with this insulating means including an insulating member 18 made of insulating adhesive tape 16 that surrounds the electrically conductive member 10; and, means for cooling the electrically conductive member, with this cooling means including a coolant fluid F, and perforations, such as 18A and 18B, in the insulating tape member 18, which constitute an inlet (i.e., 18A) and an outlet (i.e., 18B) for the coolant fluid F. The inlet and outlet permit the coolant fluid F to flow into the inlet 18A and the insulating tape member 18, between and along the plurality of strands of electrically conductive material (of which 21 are shown in FIG. 1, including representatively referenced ones 10A–10D, inclusive), and out of the insulating adhesive tape member 18 and the outlet 18B, thereby effectively and efficiently cooling the strands because there is a matrix 14 of coolant fluid flowing fairly uniformly over the strands.

More specifically, the strands of the electrically conductive member 10 may be, but need not be, twisted; and, as a matter of preference and not of limitation, the electrically conductive strands are made of standard, readily-available, magnet wire. Additionally, the insulating member 18 is preferably made of multiple layers of polyimide tape, and more particularly, the insulating material 16 preferably has an adhesive on one surface. Further, the coolant fluid is preferably an insulating liquid, such as "DC 200" which is a silicone liquid commercially available from the Dow Corning Co. of Midland, Michigan, or such as "Coolanol 20" which is commericially available from the Monsanto Co. of St. Louis, Mo. In the final analysis, even aircraft oil may be used as the coolant fluid.

Figure 3:
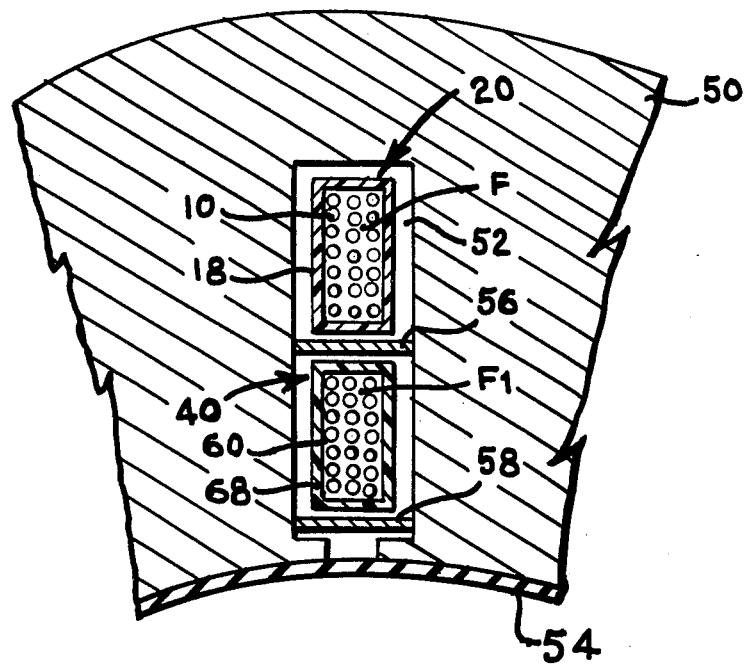
FIG. 3 is an end view, in simplified schematic and pictorial form, partially fragmented and partially in cross section, of two of my inventive electrical conductors in their working environment.

With reference to FIG. 3, therein are shown, in an end view, two of my inventive fluid-cooled electrical conductors 20 (previously shown and described) and 40 which is identical to conductor 20. More precisely, FIG. 3 is a section through a double-layer, two conductor per slot winding of a stator 50 of an electrical machine. The stator 50 is typically of laminated iron and has a slot 52 for a winding, with a bore seal 54 across the bottom opening of the winding slot 52 to exclude the coolant fluid from the rotor cavity (not shown, but located below the bore seal 54).

The two inventive conductors 20 and 40 are double-layered (i.e., disposed in a stacked position) in the winding slot 52, with a separator 56 (i.e. a "middle stick") disposed between them, and with a supporting element 58 (i.e., "bottom stick") positioned at the bottom of the lower conductor 40 and longitudinally across the winding slot 52.

The fit between the conductors 20, 40 and the slot 52 is, in actuality, much closer than depicted in FIG. 3 to insure that a substantial portion of the coolant fluid flows through said conductors rather than externally in less effective paths.

Each of the two conductors 20 and 40 comprises an electrically conductive member (i.e., 10 for 20, and 60 for 40) surrounded by an insulating member (i.e., 18 for 20, 68 for 40), with a coolant fluid (F for 20, and F1 for 40) flowing through the insulating member and between and along the strands of the electrically conductive member.

MANNER OF USE OF THE PREFERRED EMBODIMENT

The manner of use, and of operation, of the preferred embodiment 20, FIGS. 1-3, inclusive, of my inventive fluid-cooled electrical conductor can be easily ascertained by any person of ordinary skill in the art from the foregoing description, coupled with reference to the contents of the Figures of the drawing.

For others, it is sufficient to say that, as described and as shown previously, the strands, such as 10A-10B, FIGS. 1 and 2A, of the electrically conductive member 10, FIGS. 1-3, inclusive, of my fluid-cooled electrical conductor 20, FIGS. 1-3, inclusive, are efficiently and effectively cooled by the flow of a coolant fluid F, FIGS. 1, 2C, 2D, and 3, into the inlet 18A, FIGS. 1, 2C, and 2D, through the insulating member 18, FIGS. 1, 2C, and 2D, along the length of and between the spacings of the strands of the electrically conductive member 10, and out of the outlet 18B, FIGS. 1, 2C and 2D, and the insulating member 18. The structure of the conductor 20 is best understood by a reading of the description of my inventive method of making it; and, the uniqueness of the structure of the conductor 20 can be best appreciated by accepting the fact that, unlike the prior art, the conductor 20 can be made in very small sizes, transfers heat in an excellent manner, and causes only minimal extraneous electrical losses.

CONCLUSION

It is abundantly clear from all of the foregoing, and from the contents of the Figures of the drawing, that the stated objects, as well as related objects, of my invention have been achieved.

It is to be noted that, although there have been described and shown the fundamental and unique features of my invention, as applied to a preferred embodiment, various other embodiments, variations, adaptations, substitutions, additions, omissions, and the like may occur to, and can be made by, those of ordinary skill in the art, without departing from the spirit of my invention.

Additionally, because of my teaching, it may occur to others of ordinary skill in the art that, in appropriate particular circumstances, the number of the basic and fundamental steps of my inventive method can be increased, decreased, or otherwise varied, and/or that their sequence can be changed. For example, the step of encapsulating a stranded electrically conductive member 10 may be increased to a plurality of steps, such as the additional steps of making a mold of a predetermined configuration (see FIG. 2A), heating the stranded electrically conductive member 10, placing the stranded electrically conductive member 10 in the mold, sealing the longitudinal ends of the mold, melting casting wax (or the resin), pouring the molten casting wax (or the resin), into the mold, and the like. In this regard, it is to be noted that in spite of any variations in the number or sequence of the steps of my method, the same desired results will be obtained, nevertheless.

What is claimed is:

1. A method of making an electical conductor capable of being fluid cooled, comprising the steps of:
   a. encapsulating a stranded wire electrically conductive member of predetermined length in a material having characteristics of good adhesion, flexibility, and removability, thereby forming a matrix in which said stranded electrically conductive member is contained and supported;
   b. wrapping said matrix with tape of insulating material, thereby creating a member of insulating material which surrounds said matrix and said electrically conductive member in said matrix;
   c. providing openings through said insulating member for passage therethrough of an insulating coolant fluid; and
   d. removing said matrix material from said electrically conductive member and from said insulating member.

2. The method, as set forth in claim 1, wherein said method comprises the additional step of shaping said tape-wrapped matrix into a predetermined shape for a preselected use.

3. The method, as set forth in claim 1, wherein said method comprises the additional step of placing said strands of said stranded electrically conductive member in tension before encapsulating said electrically conductive member.

4. The method, as set forth in claim 1, wherein said method comprises the additional step of twisting said stranded electrically conductive member before encapsulating said electrically conductive member.

5. The method, as set forth in claim 1, wherein said matrix material is heat-meltable, and wherein said method comprises the additional step of heating and melting said matrix material before removing said matrix material.

6. The method, as set forth in claim 5, wherein said matrix material is a casting wax.

7. The method, as set forth in claim 5, wherein said matrix material is a resin.

8. The method, as set forth in claim 7, wherein said resin is a polyester base thermoplastic elastomer resin which is readily soluble in methyl ethyl ketone and, thereby, is removable therewith after heat-melting.

9. The method, as set forth in claim 1, wherein said tape of insulating material is made of polyimide.

10. The method, as set forth in claim 9, wherein said tape has an adhesive backing.

11. The method, as set forth in claim 1, wherein said step of wrapping said matrix with an adhesive tape of insulating material further comprises half-lapping said tape while wrapping, and then re-wrapping said maxtrix while half-lapping said tape, thereby creating an insulating member having multiple layers of insulating material to any desired thickness.

12. The method, as set forth in claim 5, wherein said heat-meltable material encapsulating said stranded electrically conductive member is heated, melted, and removed with the use of hot oil.

13. The method, as set forth in claim 1, wherein said material encapsulating said electrically conductive member is removed by centrifuging.

14. The method, as set forth in claim 1, wherein said stranded electrically conductive member comprises a plurality of strands of electrically conductive magnet wire.

15. A method of making an electrical conductor capable of being fluid cooled, comprising the steps of:
   a. encapsulating a stranded wire electrically conductive member of predetermined length in a material having characteristics of good adhesion, flexibility, and removability, thereby forming a matrix in which said stranded electrically conductive member is contained and supported;
   b. inserting said matrix into a tube of insulating material, thereby creating a member of insulating material which surrounds said matrix and said electrically conductive member in said matrix;
   c. providing openings through said insulating member for passage therethrough of an insulating coolant fluid; and
   d. removing said matrix material from said electrically conductive member and from said insulating member.

* * * * *